June 28, 1960 R. E. HEFTI ET AL 2,942,471
THERMOELECTRIC TEMPERATURE MEASURING SYSTEM
Filed Nov. 8, 1954 5 Sheets-Sheet 2

INVENTORS
Roy E. Hefti
By William D. Brown
Carlsen + Hoyle
ATTORNEYS

June 28, 1960

R. E. HEFTI ET AL 2,942,471

THERMOELECTRIC TEMPERATURE MEASURING SYSTEM

Filed Nov. 8, 1954

INVENTORS
ROY E. HEFTI
BY WILLIAM D. BROWN

ATTORNEYS

June 28, 1960  R. E. HEFTI ET AL  2,942,471
THERMOELECTRIC TEMPERATURE MEASURING SYSTEM
Filed Nov. 8, 1954  5 Sheets-Sheet 5

INVENTORS
ROY E. HEFTI
WILLIAM D. BROWN
BY Carlsen & Hagle
ATTORNEYS

United States Patent Office 2,942,471
Patented June 28, 1960

2,942,471
THERMOELECTRIC TEMPERATURE MEASURING SYSTEM

Roy E. Hefti and William D. Brown, Des Moines, Iowa, assignors to Hot Spot Detector, Inc., Des Moines, Iowa, a corporation of Iowa Filed Nov. 8, 1954, Ser. No. 467,312

6 Claims. (Cl. 73—341)

Our invention relates to improvements in thermoelectric temperature measuring systems wherein an electrically operative temperature indicator is selectively connected to any one of a plurality of remotely located thermocouples or measuring elements for indicating the temperatures or other conditions of the media thereabout. There are many industries and fields in which a system of this kind will find application but for convenience in the following description, and without in any way limiting ourselves to such use, we will set forth the application of the system to grain elevators or granaries.

In the field of grain storage the need is indeed great for a flexible and practical system for detecting changes of the temperature of the grain throughout its bulk since variations in temperature is the surest indication of the condition of the grain. Moisture, molds, the enzymatic action of the grain and insect infestation all have a bearing upon the keeping qualities of the grain and in view of the tremendous stocks of grains now in storage because of a succession of good crop yields and the Government sponsored storage support program the problem of safely keeping these large stocks is a particularly acute one, of national and international significance. The problem of maintaining a watch upon the temperatures of these enormous stored stocks is further aggravated by the very nature of the storage facilities themselves which usually take the form, in each installation or elevator, as it is commonly called, of a large number of silo-like bins, of considerable height, in each of which a series of vertically spaced thermocouples must be suspended in the grain itself. Further for convenience in elevating, storing, discharging and sometimes processing the grain, as well as for architectural reasons, the bins are grouped in what are commonly called sections and in a large storage elevator there may be a number of sections each having a multiplicity of bins and in total forming storage volume for millions of bushels. Obviously to read the temperatures aloft from each string of thermocouples in each bin is impractical, whereas to extend the necessary individual wires from each thermocouple in each bin in each section to a central reading point would be fantastically complicated and prohibitively expensive.

Bearing in mind the foregoing problems it is the primary object of our invention to provide a thoroughly practical, comparatively inexpensive and exceedingly flexible system whereby temperatures may be read or otherwise indicated or recorded, by a master control unit located at a central point, from any of a profusion of different remotely located zones in the various bins, so that a close watch may be kept upon the temperature of the whole bulk of the stored grain with a maximum of convenience. For example, and here again without implication of limitation, it is possible with our system to check temperatures at as many as ten thousand and eighty different points, from a central station as remote as a quarter mile away, with only eighteen interconnecting conductors.

It is a further object of our invention to provide a system in which temperature points to be checked may be selected manually or automatically at the will of the operator and with complete flexibility as to the sequence in which the points to be checked are selected. For example the operator may know from previous observations that certain points in the elevator have indicated impending trouble and he can immediately run a check on these trouble spots without following a set routine involving checking the temperatures throughout the elevator. In a large installation this feature alone saves much time.

A further object of our invention is to provide a system of this nature wherein the sections, bins and then the individual thermocouples in each bin are controllably connected to the central station by a system as master and slave switches and suitable interlocking circuits, all as will presently appear, in such fashion that with a minimum of interconnecting wiring the thermocouples may be selected and, immediately as each is connected to the reading or recording instrument at the central station, all energizing and operating currents are removed from the control wires so that the relatively minute electromotive forces developed by the thermocouples may be accurately reflected as temperature indications without influence from other current flowing in the system.

Still another object of our invention is to provide a system of this nature which is convenient to service, is simplified to the point that breakdowns are minimized, and which is also particularly flexible as regards the addition of further thermocouples and controls to an already installed system if the elevator storage capacity is enlarged by the addition of bins and sections. In connection with the servicing of the system it is further such that checking for defective parts of the system is possible from the areas in the elevator immediately adjacent the trouble spot, i.e., aloft in the elevator at the sections or bins.

Still a further object is to provide a system of this nature which includes an extremely simple timing circuit for automatically scanning the various temperature points, with a choice of two speeds according to whether temperatures are to be recorded or simply compared.

Another object is to provide a system of this kind operating in part on alternating current and in part on direct current, to secure the maximum of advantages from both kinds of supply, as will appear hereinafter.

Many other important as well as ancillary objects of our invention will become apparent in the course of the following detailed specification, in which reference is made to the accompanying drawings wherein.

Figure 1:
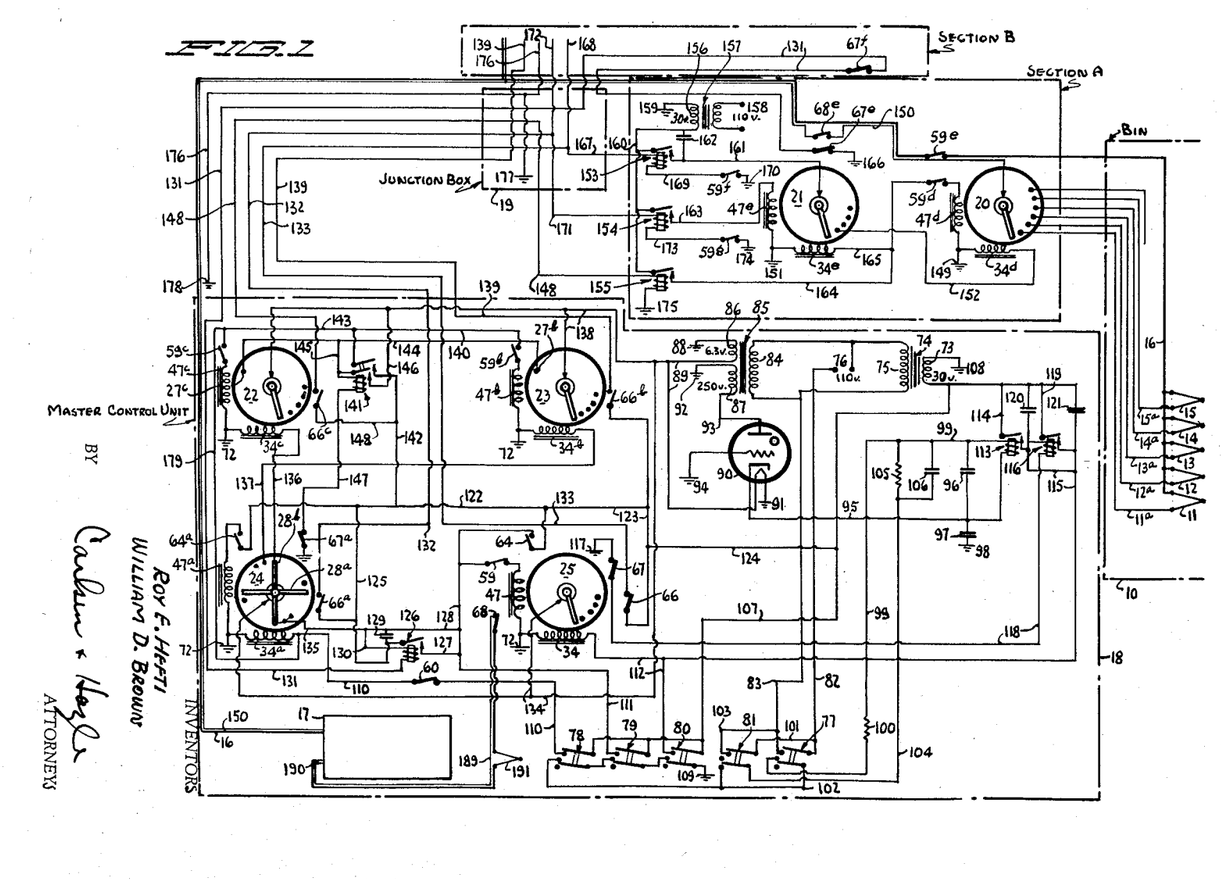
Fig. 1 is a schematic wiring diagram of one version of our thermoelectric temperature measuring system as adapted to grain elevator use, showing the circuits in their normal or inactive condition.
Figure 2:
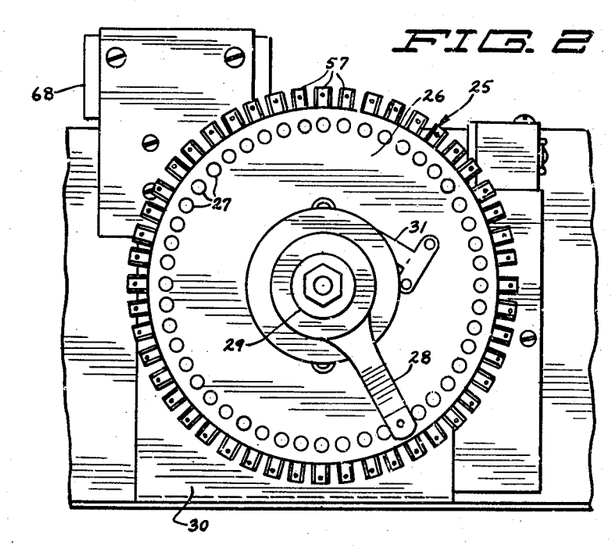
Fig. 2 is a face view of the master thermocouple stepping switch, illustrative of all of such switches used in the system.
Figure 3:
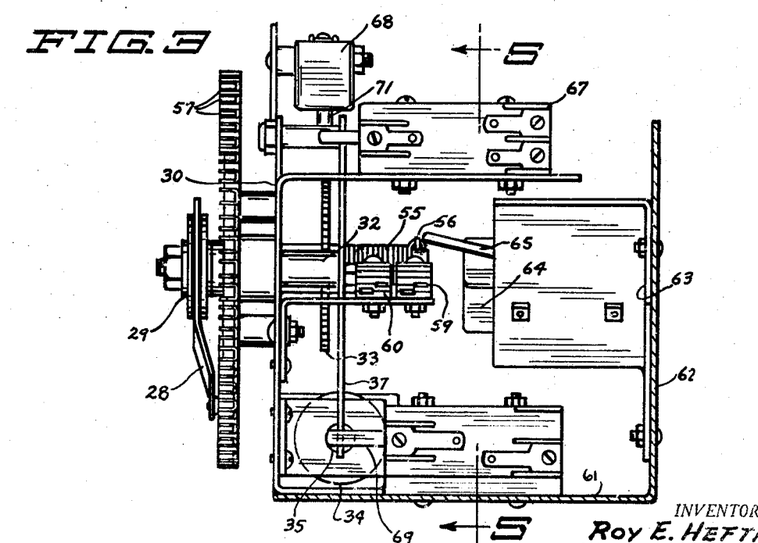
Figs. 3 and 4 are side views of the switch from opposite directions.
Figure 4:
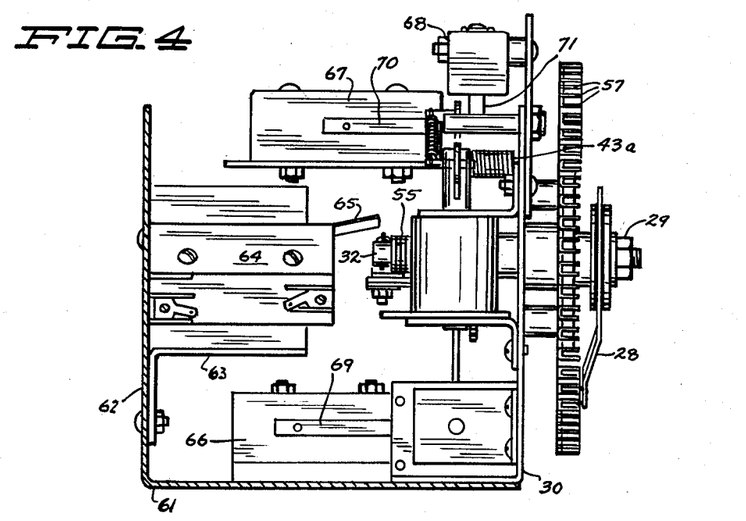

Referring now more particularly and by reference characters to the drawing, the system as disclosed in Figs. 1 through 7 will first be described in detail. In Fig. 1, 10 designates a grain storage bin wherein a plurality of thermocouples 11, 12, 13, 14, 15, etc., are located vertically one above the other. As is common practice such thermocouples consist of junctions of copper wire, the individual conductors of which are designated at 11a, 12a, 13a, 14a, 15a and a common wire 16 called Constantan all making up a cable suspended in the bin. Copper and Constantan for the wires are not the only materials which may be used, and other metals and alloys are used where the temperatures are much higher or lower than those appearing in grain. Thus the copper-Constantan designations as used herein are not to be regarded as limitations and are used for convenience only. While only five thermocouples are herein shown it will, of course, be also understood that the number used will depend upon the depth of the bin 10 and that they will be so spaced apart that temperature readings may be taken every few feet through the grain, from the bottom of the bin upward. For indicating such temperatures the thermocouples are connected as will presently appear to an electronic potentiometer, of a well known and commercially available type, designated at 17, so that the electromotive forces developed by the thermocouples are reflected on a scale as temperature readings. Hereinafter the potentiometer 17 will be referred to as the indicator or instrument and it is to be understood that where desired the electrical impulses at the indicator may be employed to record or print the temperature readings instead of, or in addition to, visually indicating the same. The indicator 17 is a part of a centrally located master control unit 18, so designated in Fig. 1, containing various switches and circuits to be described and such unit will usually be located in the office building of the elevator installation, remote from the bins. Aloft in each section of the elevator there is also located a section unit or box, and here these units are indicated as sections A and B, the latter being only partially shown in Fig. 1. Each section unit or box will contain a bin selector means for selecting the bins in each section and thermocouple selector means for selecting the individual thermocouples in the individual bins. The various section units must be wired to the master unit 18 and for convenience in such wiring the wires from the various sections are brought to a junction box 19 from whence the wires lead downward to the master unit, suitable conduit (not shown) being employed between the various units and boxes, of course.

For selectively establishing the various circuits a series of stepping switches are employed and in Fig. 1 such switches are, respectively, a thermocouple selector slave switch 20 for each bin and a bin selector slave switch 21 for each section, a master bin switch 22 for section A, a master bin switch 23 for section B, a section switch 24 and a master thermocouple switch 25. In the drawing only one each of the switches 20 and 21 are shown but it is to be understood that they are located in the section boxes convenient to the bins, whereas the four remaining switches 22, 23, 24 and 25 are located in the master unit 18. Each stepping switch is a conventional type but since we also employ them for actuation of other control switches, etc., we have herein shown the mechanical details of thermocouple switch 25 in Figs. 2–6 and will describe the same at this point in sufficient detail for a proper understanding of the overall operation. It is to be understood that so far as their mechanical details go all of the stepping switches are identical in construction and operation, with but minor exceptions which will be pointed out hereinafter.

Figure 5:
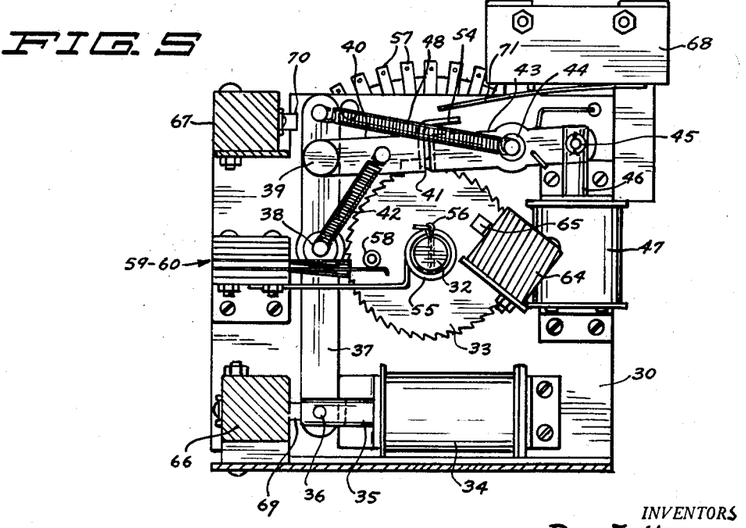
Fig. 5 is a rear elevation and section taken substantially along the line 5—5 in Fig. 3.
Figure 6:
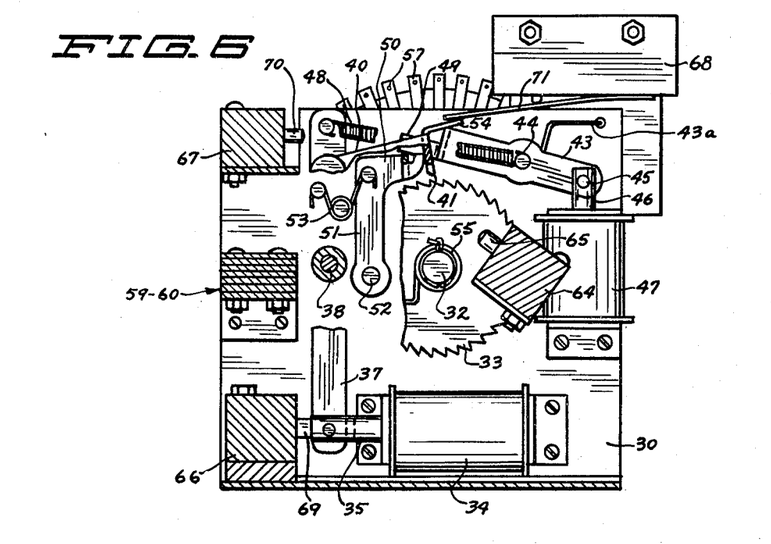
Fig. 6 is a similar view but after the switch has been reset.

Each stepping switch comprises a face plate 26 of insulating material around which is a circular series of contacts 27 adapted to be successively engaged by a wiper arm 28 operated by, but insulated from, a hub 29. The face plate 26 is secured to a main frame bracket or bracket structure 30 and contact with the wiper arm 28 is made by means of a brush 31 which is secured upon the face plate. The hub 29 is operated by a shaft 32 journaled rearwardly through the bracket 30 and secured to the shaft behind the bracket is a peripherally toothed ratchet wheel 33. The wiper arm 28 is moved around the face plate 26 into successive engagement with contacts 27 by means of a set solenoid 34, the armature 35 of which is pivoted at 36 (Fig. 5) to a lever 37 fulcrumed at 38 (Fig. 5) upon the bracket 30. Pivoted to the lever 37 at 39 is a pawl 40, the edge 41 of which is adapted to engage the teeth around the periphery of the ratchet wheel 33. A retractile coil spring 42 biases the pawl 40 downward into engagement with the ratchet wheel, but the pawl may be lifted by a lifter arm 43 fulcrumed at 44 upon the bracket and pivoted at 45 to the armature 46 of a reset solenoid 47. This arm 43 is biased in a downward direction by a torsional coil spring 43a. As seen in Fig. 5 a retractile coil spring 48 is stretched between the upper end of the lever 37 and the pivot stud 44 in order to normally bias the upper end of the lever and the attached pawl 40 toward the right. It will thus be understood that each time the set solenoid 34 is energized it will draw in its armature 35 to swing the lever 37 in a direction opposite to that just described, at which time the pawl 40 will pass freely over the ratchet teeth on the ratchet wheel and as the set solenoid is de-energized the spring 48 will return the pawl causing the edge 41 thereof to engage the ratchet teeth and move the wiper arm 28 from one contact 27 to the next. This motion is precisely limited, so that the wiper arm will move exactly one step forward for each energization of the set solenoid 34, by means of stop finger 49 formed as an offset extension of the lifter arm 43 and which engages the end 50 of a reset lock lever 51 pivoted at its lower end at 52 to the bracket 30. A light torsional coil spring 53 is arranged to bias the lever 51 toward the right, as viewed in Fig. 6, and it will be noted that the pawl 40 has an upper extended end 54 which overlies the end of the lifter arm 43 in the normal position of the parts. It will also be seen in Fig. 6 that at any time, then, it is desired to reset the switch the reset solenoid 47 is momentarily energized so that it pulls its armature 46 in a downward direction and accordingly lifts the opposite end of the lifter arm 43 so that it contacts the end 54 and swings the pawl upward clear of the ratchet wheel 33. The wiper arm 28 (Figs. 2 and 3) is then returned to its starting position or "homed" by means of a torsional coil spring 55 coiled around the extremity of the shaft 32 and secured at one end 56 (Fig. 5) thereto and at its opposite end secured in any suitable fashion to the bracket 30. This spring 55 is so arranged that it is progressively wound up during the set action of the wiper arm and so that it will return the wiper arm instantly back to its starting position once the pawl 40 is lifted clear of the ratchet wheel. In order to hold the pawl in this released position after only an instantaneous energization of the reset solenoid 47 the lifter arm 43 has its finger 49 so related to the reset lock lever 51 that the latter will hold the arm and the pawl upward in the clear, as shown in Fig. 6. Immediately, however, as the set solenoid 34 is again energized it will pull the pawl 40 against a stop provided upon the lever 51, thus swinging the latter to the left of Fig. 6, against the tension of spring 53, until the finger 49 is cleared, and can drop past the portion of the lever previously holding it up, at which point the pawl and lifter arm will immediately return to their starting positions. Any suitable form of mechanical stop (not shown) is provided in order to insure the accurate resetting or homing of the wiper arm 28 to its starting position.

From the foregoing it will be apparent that the stepping switches provide a means by which an electrical circuit may be completed between the wiper arm 28 and the contacts 27 in succession, upon successive energizations of the set solenoid 34, and also that the wiper arm may be homed to its starting position at any time merely by energizing the reset solenoid 47. As stated above contact is made with the wiper arm 28 by the brush 31 and as clearly shown the contacts 27 have radially projecting soldering lugs 57 to which wires may be connected for completing the circuits controlled by the stepping switches. In addition these switches provide a convenient means for operating suitably arranged leaf and microswitches in synchronism with the operation of the stepping switches themselves and in any relation to the condition and position of said stepping switches. It is for this reason that we have chosen to illustrate here the stepping switch 25 and it will be noted first of all that an insulated stud 58 (Fig. 5) is extended rearwardly from the ratchet wheel 33 for the operation of a pair of leaf switches of conventional construction, designated at 59 and 60. In the present instance the switch 59 is opened when engaged, in the normal position of the stepping switch, by the stud 58 whereas the switch 60 has its switch leaves reversed and in the normal position is closed by engagement with the stud 58. Obviously then as the set solenoid 34 is energized to move the wiper arm 28 upward or forward to its first contact the switch 59 will close and the switch 60 will open. In addition the entire switch structure is mounted upon an L-shaped frame member 61 (Fig. 3) having an upright back 62 and adjustably mounted by means of a swingable bracket member 63 upon this frame is a conventional microswitch 64. The operating tongue 65 of the microswitch extends forwardly into the path of the stud 58 and the microswitch bracket member is so positioned and locked that the stud 58 (Fig. 5) will engage the microswitch tongue and close microswitch 64 after the wiper arm 28 reaches its last set position. Then as the stepping switch is reset the stud 58 will clear the tongue 65 and the microswitch 64 will reopen. This, then, is a normally open switch which closes momentarily after a predetermined number of set operations of the stepping switch. In addition this stepping switch 25 operates three additional microswitches, designated at 66, 67 and 68 (Fig. 4), all of which are suitably secured to the bracket 30 and frame 61. The microswitch 66 is hooked up normally closed but the armature 35 holds the switch open and it closes upon each step forward of the wiper arm 28, for which purpose the tongue 69 of the switch is projected forwardly into the path of the armature 35 of the set solenoid 34 and is normally engaged thereby to hold the switch in the open position. Each time the set solenoid 34 is energized, however, the armature 35 moves away from the microswitch 66 permitting the tongue 69 to momentarily close the switch. The switch 67 is a normally closed switch but its tongue 70 is engaged by the upper end of the lever 37 so that each time the set solenoid 34 is energized the lever will engage the tongue 70 in order to momentarily open the switch. The microswitch 68 is secured adjacent the upper part of the bracket 30 with its tongue 71 projecting over the end 54 of the pawl 40 and this is a normally closed switch but the tongue 71 is forced upwardly when the stepping switch is reset by the engagement of the end 54 with the tongue, as seen in Fig. 6. The microswitch 68 is open only when the switch 25 is in the reset position. All of these various switches 59, 60, 64, 66, 67 and 68 are single-pole single-throw switches and it is obvious by reversing them or by reversing their connections they may be either opened or closed in synchronism with the operation of the stepping switch according to need and as will be presently made clear.

As stated supra the stepping switches 20—25 are all alike except for very minor differences, such as the employment of crossed wiper arms in switch 24 (Fig. 1) and, of course, the various leaf and microswitches vary somewhat in arrangement, but the foregoing description of the switch 25 will make it readily understandable how all of the switches function. Also as the description of the circuit proceeds these minor variations will be explained.

Returning then to the circuit of Fig. 1 all of the remaining components therein shown and the interconnecting wiring will now be set forth, beginning at the master unit 18. The set and reset solenoids of stepping switch 25 are designated by the reference numerals 34 and 47, respectively, as used in the preceding description, whereas the corresponding solenoids for the remaining switches 24, 23 and 22 in this unit are designated 34a, 47a; 34b, 47b; and 34c and 47c, respectively. It will be noted that in each instance the set and reset solenoids have adjacent terminals connected to grounds, indicated throughout at 72. These solenoids are all energized from an approximately thirty volt secondary winding 73 of a transformer 74, the primary 75 of which is connected to any ordinary alternating current source, designated by the input terminals 76. Such connection to primary 75 is controlled by a master on-off switch 77 of a conventional double-pole two-position type, and which is one of a group of five similar master control switches. The remaining master switches are, respectively, a section switch 78, bin switch 79, thermocouple switch 80 and automatic timing switch 81. The switches 78, 79 and 80 are all of the spring return variety, returning to their normal positions automatically after each operation, whereas the switches 81 and 77 are fully manual, requiring movement by hand between their two positions. The on-off switch 77 has its upper moving pole connected by a conductor 82 to one input terminal 76 while the corresponding upper fixed contact is connected through conductor 83 to the side of transformer primary 75 which is not connected to a terminal 76, so that downward movement of this on-off switch will energize the transformer. In this description, as well as that of the remaining switches 78–81, the terms "upper" and "lower" are used without limitation, mainly for convenience in description, and to correspond to the diagrammatical showing of the switches in Fig. 1.

Connected in parallel with the primary 75 of the solenoid supply transformer 74 is the primary 84 of a timer supply transformer 85 having a low voltage secondary 86 and high voltage secondary 87. The former secondary has one terminal grounded at 88 while its other is connected by a conductor 89 to the filament of a Thyratron timing tube 90, the remaining terminal of said filament being also grounded, at 91. One terminal of the high voltage secondary 87 is grounded at 92 while the other is connected by conductor 93 to the plate of tube 90. The grid of tube 90 is grounded at 94 while the cathode is connected by a conductor 95 to the junction between a pair of fixed capacitors 96—97 of equal capacitance, the latter one of which has one terminal grounded, at 98. The remaining terminal of capacitor 96 is connected to a conductor 99 which is connected through a timing speed controlling resistor 100 to the central fixed contact of the switch 77. The upper moving poles of both switches 77 and 81 are connected by conductor 101, while the lower moving pole of switch 77 is connected by a conductor 102 to the lower fixed contact of switch 81 and center fixed contact of switch 78. The upper fixed contacts of switches 77 and 81 are connected together by conductor 103 while the lower moving pole of switch 81 is connected by conductor 104 and through another timing speed controlling resistor 105 to the conductor 99, a fixed capacitor 106 being connected in parallel with the latter resistor as shown. Resistor 105 and capacitor 106 comprise an R-C timing circuit which is completed through conductor 104 and switch 81. When switch 81 is in its lower position the circuit between conductor 104 and ground 109 is completed through switches 78, 79 and 80, and the purpose in making this circuit through these three switches is to permit the operator of the system to skip sections, bins or thermocouples, even though the automatic timing circuit is in operation. Each time that any of the switches 78, 79 or 80 are moved down, in changing from section to section, bin to bin or thermocouple to thermocouple, the ground circuit between conductor 104 and ground 109 is opened and this in turn opens the automatic timing circuit halting the automatic timer control of the system. If automatic operation at a higher speed is desired the switch 77 is raised, placing resistor 100 in parallel with resistor 105, through the conductor 104, switch 81 and conductor 102.

Completing the connections between the remaining master control switches and other components it will be seen that all of the upper moving poles of the switches 78, 79 and 80 are tied together and connected by conductor 107 to one terminal of the secondary 73 of transformer 74, the remaining terminal of which winding is grounded at 108. The lower pole of switch 80 is grounded, at 109, while the lower poles of switches 78 and 79 are connected, respectively, to the center fixed contacts of switches 79 and 80. The lower fixed contacts of all three switches 78–80 are open but the upper fixed contact of switch 78 is connected by a conductor 110 to the ungrounded terminal of the set solenoid 34a of stepping switch 24, with the aforesaid leaf switch 60, operated by stepping switch 25, interposed in said conductor. The upper fixed contact of switch 79 is connected by a conductor 11 to the ungrounded terminal of the reset solenoid 47 of stepping switch 25, with the leaf switch 59 aforesaid interposed in and normally breaking said conductor, and is also connected to one terminal of switch 64. The upper contact of switch 80 is connected by a conductor 112 to the ungrounded terminal of the set solenoid 34 of stepping switch 25.

Connected in parallel with the condenser 96 forming part of the timing circuit is the coil of a single-pole single-throw timer relay 113. One terminal of said relay is connected by conductor 114 to the ungrounded side of the secondary 73 of transformer 74 while the other terminal is connected by a branching conductor 115 to the conductor 112 leading to the set solenoid 34 of stepping switch 25. Also connected to such conductor 115 is one end of the coil of a single-pole single-throw interlock relay 116, the other end of which winding is selectively connected to a ground 117 through a conductor 118 and the microswitch 67 on stepping switch 25. One terminal of the relay 116 is also connected by a conductor 119 to the ungrounded side of the secondary 73 while the other terminal is connected to the aforesaid conductor 115. Fixed condensers 120 and 121 are, as clearly shown, connected across the contacts of the relays 113—116 for the usual purpose.

The section selector stepping switch 24 operates microswitches 66a, 67a and 64a which correspond in their synchronization with the action of the stepping switch to the aforesaid switches 66, 67 and 64, respectively. One terminal of the switch 64a is connected by a branching conductor 122 to the corresponding terminal of switch 64, and by a conductor 123 to one terminal of the switch 66, and by a conductor 124 to aforesaid conductor 107. A conductor 125 also connects this same circuit to one terminal of the switch 66a and then to one terminal of a single-pole single-throw interlock relay 126. The other terminal of such relay is connected by a conductor 127 to the aforesaid conductor 111. Here again a condenser 129 is connected across the relay contacts. The winding of the relay 126 is connected by conductor 130 to conductor 128 and to an interlock conductor 131 leading out of the master unit 18. The remaining terminal of switch 64a is connected to the ungrounded terminal of reset solenoid 47a of stepping switch 24 while the remaining terminal of switch 66a is connected to a bin reset conductor 132, also leading out of unit 18.

A branching conductor 134 connects the wiper arm 28 of stepping switch 25 to the ungrounded terminal of the secondary 86 of transformer 85, and also to one of the crossed wiper arms 28a—28b of stepping switch 24, here shown as wiper arm 28a, which is, of course, insulated from the other wiper arms 28b but operates in unison therewith as the switch is set and reset. A series of adjacent contacts of the stepping switch 24 are connected together and to the conductor 128, as designated at 135, to be engaged in succession by one end of the wiper arm 28b while the equal number of such contacts engaged by the other end of this wiper arm are individually connected by separate conductors 136—137 to the ungrounded terminals of the set solenoids 34c and 34b of the stepping switches 22 and 23. The wiper arms of these switches 22 and 23 are also connected by a branching conductor 138 to the ungrounded terminal of the secondary 86 of transformer 85. Thus there is an approximately six volt potential (from secondary 86 of transformer 85) on the wipers of all of said stepping switches 22–25, except for wiper 28b of switch 24 which carries the approximately thirty volt potential of secondary 73 of transformer 74.

The stepping switch 23 is the bin selector for section B and the switch 66b, corresponding to switch 66 at stepping switch 25, is interposed in a section B bin set and thermocouple reset conductor 139 leading from the aforesaid conductor 123 and out of the unit 18, through the junction box and into section B. A switch 59b, corresponding to switch 59 at stepping switch 25, is interposed in a conductor 140 leading to the upper switch section of a double-pole single-throw relay 141, the other terminal of which section of the relay is connected by a conductor 142 to the thirty volt circuit conductor 122. The conductor 140 also continues through a conductor 143 and through a switch 59c at stepping switch 22, again corresponding to aforesaid switch 59, to the ungrounded terminal of reset solenoid 47c. Contacts 27b and 27c on the respective switches 23 and 22, which are contacted by the respective wiper arms of these switches after the last bins are selected in sections A and B, are connected together by a conductor 144, and are also connected by a branching conductor 145 to one terminal of the lower switch section of the relay 141 and to one terminal of the winding thereof. The other terminal of the lower switch section of the relay is connected by a conductor 146 to the approximately six volt circuit conductor 138, while the remaining terminal of the relay winding is connected by the conductor 147 through switch 67a at stepping switch 24 to ground. Switch 66c at stepping switch 22, corresponding to switch 66, is interposed in a section A bin set and thermocouple reset conductor 148 leading from the approximately thirty volt circuit at conductor 142 leading out of the unit 18, through the junction box 19 and into section A.

Turning now to the components in the unit denoted section A the stepping switch 20 is the slave selector switch for selecting the thermocouples 11, 12, etc., and for this purpose the contacts of this switch are connected to the conductors 11a, 12a, etc., in such sequence that successive set operations of the switch will connect its wiper arm first to the lowermost thermocouple, then to the next and so on. This switch 20, of course, has a set solenoid 34d and a reset solenoid 47d and they are connected each by one terminal to ground at 149. The wiper arm of the switch 20 is connected to a copper wire 150 forming, with the Constantan 16 from the thermocouples, a duplex leading through the junction box 19 (although shown for clarity in Fig. 1 as passing alongside said box) down to the master unit and connected to the indicator instrument 17. Thus it will be understood that as each successive thermocouple 11, 12, etc., is connected in circuit by this switch 20 the temperature in the bin 10 will be read or otherwise indicated at progressively higher levels in the grain. The bin selector slave switch 21 also has a set solenoid 34e and a reset solenoid 47e the two of which have common terminals grounded at 151. The ungrounded terminal of the set solenoid of the thermocouple selector switch 20 is connected by a conductor 152 to the first wired contact on the bin selector switch 21 so that the first set operation of this switch will connect switch 20 in circuit. For other bins there will be other thermocouple selector switches like that at 20 and they will have their set solenoids wired to subsequently reached contacts on the bin selector switch 21 as will be readily understood, one bin only being shown here for convenience sake.

The set and reset solenoids in the section A unit are supplied from the secondary 156 of a transformer 157 having primary terminals 158 for connection to the usual alternating current source, whereas a series of three single-pole single-throw relays 153, 154 and 155 have their coils supplied from transformer 74 in the master unit 18. The voltage at secondary 156 is about thirty volts as in the master unit 18 and one terminal of the winding is grounded at 159 while the other is connected by a conductor 160 to one terminal of the relay switches of each of the relays 153 to 155. The remaining switch terminal of the relay 153 is connected by a conductor 161 to the wiper arm of bin selector switch 21 and a condenser 162 is connected across this relay as shown. The remaining switch terminal of the relay 154 is connected by a conductor 163 to the ungrounded terminal of the reset solenoid 47e of switch 21 while the remaining switch terminal of relay 155 is connected by a conductor 164 to the ungrounded terminal of the reset solenoid of switch 20 but with a switch 59d interposed therein operated by switch 20 and functioning like switch 59 previously described. An identical switch 59e also operated by switch 20 is interposed in and breaks the Constantan 16. The same conductor 164 is permanently connected by a branch conductor 165 to the ungrounded terminal of the set solenoid 34e of switch 21.

The interlock conductor 131 after going through the junction box 19 extends into section B wherein a switch 67f operated by the bin selector switch (not shown) for that section is interposed in the conductor and returning from section B the conductor extends into section A where it is grounded at 166 through a switch 67e operated by switch 21 these switches corresponding to switch 67f aforesaid.

One terminal of the coil of relay 153 is connected by a conductor 167 to the thermocouple set conductor 133, and a corresponding conductor 168 leads from the junction box 19 into section B for making a corresponding connection to the components thereon. The remaining terminal of the coil of relay 153 is connected by a conductor 169 to ground 170 through a switch 59f operated by switch 21, and corresponding to switch 59 aforesaid. One terminal of the coil of relay 154 is likewise connected into the junction box by a conductor 171 to the bin reset conductor 132 and here also a conductor 172 leads into section B for the same connection. The remaining terminal of the coil of this relay 154 is connected by a conductor 173 to ground 174 through a switch 59g, corresponding to switch 59f. One terminal of the coil of relay 155 is connected through the junction box to the section A bin set and thermocouple reset conductor 148. The corresponding section B bin set and thermocouple reset conductor 139 extends through the junction box and into section B for similar connection. Then the remaining terminal of the coil of relay 155 is grounded at 175.

While all of the grounds may be common the control cable made up of the Constantan-copper duplex and the conductors 131, 132, 133, 139 and 148 preferably includes a ground wire 176 having grounds 177 and 178 close to the units at the opposite ends of the cable.

To facilitate an understanding of the following description of the operation of the system, both the normal and actuated conditions of the various leaf and microswitches are listed as follows:

Switch 59 is open at zero position of switch 25 and closed at any set position thereof.

Switch 60 is closed at zero position of switch 25 and open at any set position thereof.

Switch 64 is normally open and closes after last set position of switch 25.

Switch 66 is normally open and closes on each step (or set) up of switch 25.

Switch 67 is normally closed but opens on each step up of switch 25.

Switch 64a is normally open and closes after the last position of stepping switch 24.

Switch 66a is normally open and closes on each step up of switch 24.

Switch 67a is normally closed and opens on each step up of switch 24.

Switch 59b is normally closed and opens at zero position only of switch 23.

Switch 66b is normally open and closes at each step up of switch 23.

Switch 59c is normally closed and opens at zero position only of the switch 22.

Switch 66c is normally open and closes at each step up of switch 22.

Switch 59d is normally closed and opens at zero thermocouple of switch 20.

Switch 59e is normally closed and opens only at the zero thermocouple position of switch 20.

Switches 67e and 67f are normally closed and open each time the respective bin selector switches (like 21) move up a step.

Switch 68e is normally closed and opens only when switch 21 is at zero.

Switches 59g and 59f are normally closed and open only at the zero bin setting of switch 21.

The relays 113, 116, 126, 141, 153, 154 and 155 are all normally open, closing only upon energization of their respective windings.

In the operation of the system as thus far described, it will first of all be assumed that it is desired to read or record temperatures in the bin 10 of section A. The on-off switch 77 is first closed, closing the primary circuits to the various transformers in order to supply operating potentials for the system, such circuit being completed through the upper moving pole of this switch, the upper fixed contacts and conductors 82—83 to the terminals 76. In the two section (A and B) system herein shown the wiper arm 28b is normally in position for reading in section A and its operation in shifting to section B will be presently set forth. To select a bin in section A, then, the operator momentarily closes bin master switch 79 and a circuit is completed up through the wiper arm 28b of section selector switch 24 which may be traced from the conductor 107 through the upper pole of switch 79, through conductors 111, 128, the wiper arm 28b and conductor 136 to the set solenoid 34c of the section A bin selector switch 22 and to grounds 72 and 108 through secondary 73 of the transformer 74. This momentarily energizes the set solenoid 34c and moves the switch 22 up one step. The switch 66c on stepping switch 22 is momentarily closed each step up as just described and such action sends energy up through the conductor 148 to the relay 155, the circuit being traced from conductors 124, 132, 148, switch 66c, conductor 148, the winding of relay 155 to ground 175 and back to the secondary 73 through ground 108. As this relay 155 is energized its switch contacts close and a circuit is completed through the set solenoid 34e of the bin selector switch 21 in section A, which may be traced from secondary 156 of transformer 157 through the conductor 160, the relay 155, conductors 164 and 165, the solenoid and ground 151 and 159 back to said secondary, thus moving switch 21 up one step to the first bin. To make this action more positive the closing of switch 79 also sends current through the coil of interlock relay 126, through a circuit traced from the conductors 111, 128 and 130 to the coil, through conductor 131, switches 67f and 67e and ground 166 back to the secondary. This closes relay 126 and it remains closed until the bin selector switch 21 (or its equivalent in section B) moves up one complete step at which time one or the other of the switches 67f and 67e, which are in series, is opened. When this occurs relay 126 reopens, opening the circuit to the set solenoid 34c of the section selector switch 22 and this interlock circuit insures the full movement of the bin selector switches in the sections by the bin selector switches in the master unit.

Next the master thermocouple switch 80 is closed momentarily and current is supplied to the set solenoid 34 of the stepping switch 25 through a circuit traceable through conductors 107 and 112 to the solenoid and through grounds 72 and 108 back to secondary 73. This moves the switch 25 up one step and at the same time closes switch 66 and completes a circuit to the coil of relay 153 through the conductors 124, 123, through switch 66, through the thermocouple set wire 133, the conductor 167, the coil, the conductor 169, normally closed switch 59f to ground 170 and 108 back to secondary 73. Note that this circuit is completed through switch 59f and therefore will not be closed unless this switch is closed, as it is only when the bin selector switch 21 is on a bin contact. As relay 153 closes it sends current through the wiper arm of bin selector switch 21 and to the set solenoid 34d of the thermocouple selector switch 20, the circuit being traceable from secondary 156 through conductors 160 and 161, the switch 21, conductor 152 and to the solenoids and grounds 149 and 159 back to the secondary, and this action, of course, moves the switch 20 up one step. At the same time, to be positive a full step operation takes place throughout, current is supplied the interlock relay 116 through a circuit traced through conductor 112, the switch 80, conductor 107, the secondary 73 to ground 108, and through conductor 115, the relay, conductor 118, microswitch 67 and to ground 117. This circuit remains closed until stepping switch 25 opens microswitch 67 on each full step forward. It will be understood, as aforesaid, that the master switches 78, 79 and 80 are all of the spring return type, and successive closing actions of the thermocouple selector switch 80 will then advance the thermocouple selector switch 20 a step at a time so that successive temperature readings will be taken up through the grain in bin 10 from the remaining thermocouples. The thermocouple-to-instrument 17 circuit is, of course, completed through the duplex made up of the Constantan and copper wires 16 and 150. When the last thermocouple in the bin 10 is reached the master thermocouple switch 25, which has also advanced as switch 20 moved up, will close the microswitch 64 and a circuit is immediately closed through the leaf switch 59 to energize the reset solenoid 47 and reset switch 25, the circuit being traceable from the solenoid through closed switch 59, conductor 128, the now closed switch 64, conductors 123, 124 and 107, to secondary 73 of transformer 74 and grounds 108 and 72. At the same time energy is directed through the section selector switch 24 to the set solenoid 34c of the section A bin selector switch 22 to advance the same one step, the circuit being completed through the same circuit just traced, plus the conductor 128, wiper arm 28b of switch 24 and conductor 136 to set solenoid 34c and ground 72. In turn this action closes a circuit through microswitch 66c on section A bin selector switch 22 closing relay 155 (the same action as if bin master switch 79 had been closed) and moving the bin selector switch 21 up one step to the next bin, the circuit being traced from the secondary 73 through conductors 107, 124, 123, 122, 142, 148, microswitch 66c, conductor 148, the relay coil and grounds 175 and 108 back to the secondary. As the relay 155 closes the set solenoid circuit of bin selector switch in section A is closed as aforesaid. At the same time a circuit is completed through the reset solenoid 47d of the thermocouple selector switch 20, through conductors 164, the closed switch 59d, reset solenoid 47d to ground 149, thus resetting switch 20 ready for its next cycle of operation, and the resetting circuit being opened by switch 59d when the switch 20 returns to its normal position.

This operation can be repeated through all of the thermocouples in all of the bins in section A of the elevator, the bin selector slave switch 21 shifting to each thermocouple switch (like 20) in succession until the last thermocouple is reached at which time the master bin selector switch 22 will have brought its wiper arm into contact with the contact 27c at which point energy will be supplied to the relay 141 through conductors 144, 145, the coil of the relay, the conductor 147, switch 67a to ground, and through the wiper arm of switch 22 and conductor 138 which connects both wipers of the section switches 22 and 23 to the secondary 86. The relay closes and the upper switch contacts close a circuit from conductors 107, 124, 123, 122, 142, the relay and conductor 143 and switch 59c to reset solenoid 47c and back to ground. This resets the section A bin selector switch 22 to zero and also a circuit is closed to section selector switch 24 to move it a step forward to the next section B, the circuit being through a conuctor 179 which places set solenoid 34a in parallel with reset solenoid 47c. Simultaneously the microswitch 67a on master section switch 24 is opened by the stepping up of this switch and this opens the locking circuit of the relay 141 to ground.

It will, of course, be understood that the master section selector switch 78 may be operated when desired to move up the section selector stepping switch 24, each time switch 78 is operated the set solenoid 34a being energized through the conductors 107 and 110 but a section may not be selected unless the system is at zero thermocouple condition since switch 60 is opened by thermocouple master switch 25, except when the same is at its zero position. It will further be noted that the duplex, made up of the Constantan and copper wires 16 and 150, is extended into section B, as is also the ground wire 176.

The system may when desired be operated wholly automatically, making it unnecessary to repeatedly close the thermocouple master switch 80, by moving the master switch 81 downward, grounding resistor 105 and placing the timer in operation. The pulses of energy from the tube 90 are directed to the coil of timer relay 113 which closes and also closes the relay 116, through conductor 114, relay 113, conductor 118 and to ground, the same action as though master switch 80 itself had been closed. Succeeding pulses will, of course, repeatedly operate the system to read successive thermocouples and if it is desired to increase the timer speed, as when it is desired only to scan the temperatures, it is only necessary to lift the on-off master switch 77 far enough so that its lower pole grounds the resistor 100, placing it in parallel with resistor 105, as hereinbefore described. Assuming the values of the condensers and resistors are properly chosen it will make the system operate approximately twice as fast when the resistors are paralleled. The condenser 96 is placed across the coil of the relay 113 and is charged by each timing pulse providing holding time sufficient to insure the closing of the relay by each pulse.

Figure 7:
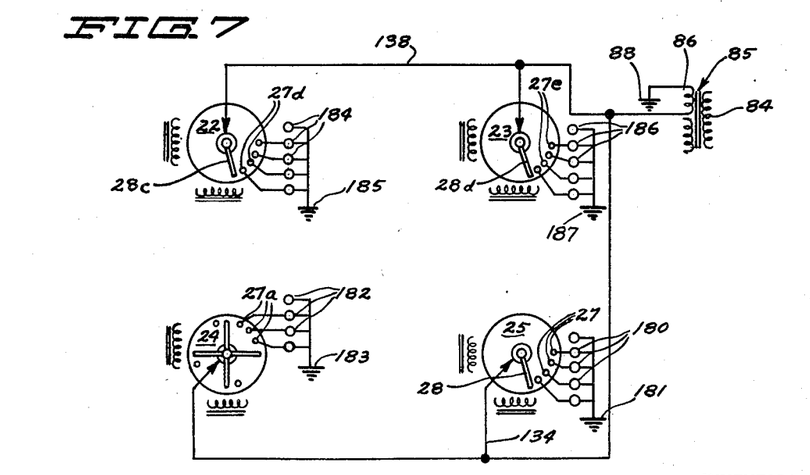
Fig. 7 is a partial schematic, showing the arrangement of the indicator or pilot lights used in the master control unit.

In order that the operator may determine at a glance which thermocouple in which bin and which bin in what section is being read the stepping switches 22-25 in the master unit 18 are used to control the illumination of a series of indicator or pilot lights, as seen in Fig. 7. Switch 25 indicates thermocouples and for this purpose its contacts 27 are connected in sequence to a vertical row of lights 180, the opposite terminals of which are all tied together and grounded at 181. As each contact is reached by the wiper arm 28 a circuit is completed to the proper light 180, traceable from the secondary winding 86 of transformer 85 through the conductor 134 and wiper arm to the contact and back through grounds 181 and 88 to the secondary. Similarly the sections are indicated by a row of lights 182 connected to the contacts 27a of switch 24 which are engaged in succession by the wiper arm 28a, the remaining terminals of the lights being all grounded at 183. The bins in section A are indicated by a row of lights 184 connected to the contacts 27d of switch 22 and grounded at 185, the circuit being traced in this case from the secondary 86 through conductor 138, the wiper arm 28c of the switch, through the lights, and by the grounds 185 and 88 back to said secondary. The bins in section B are indicated in exactly the same way, by a row of lights 186 grounded at 187 and connected to the contacts 27e engaged in succession by wiper arm 28d. Suitably inscribed indicia plates (not shown) are, of course, used in connection with the various lights to indicate their purpose and may be grouped, along with the master switches 77–81, convenient to the instrument 17.

The system will unless otherwise desired operate through a full cycle, reading all of the thermocouples in all of the bins, but the operator may at will skip about in order to check only certain thermocouples if desired. For example if a bin is not full of grain then only those thermocouples immersed in the grain need be read and when this is done the operator merely shifts to another bin by momentarily closing the bin master switch 79. As this is done the previously used thermocouple selector switches are restored to zero ready for their next use. The same is true as to bins and sections, the momentary closing of the master switches 78 and 79 shifting the system to any bin and any section at will. This complete flexibility of the system obviously is an important time saver where all bins are not filled or where previous readings may have indicated that certain portions of the grain require frequent readings. Servicing of the system is also facilitated by the orderly layout of the stepping switches and the leaf and microswitches operated thereby, as well as by the unit construction of the equipment.

Also arranged for operation by the master thermocouple selector switch 25 is the aforesaid microswitch 68 which is normally open but is closed each time the switch 25 resets to its zero thermocouple position. This switch 68 is utilized to connect the instrument 17 to read room temperature between readings in one bin and the next so that the reading speed of the instrument is increased. Ordinarily the greatest temperature variation occurs between the last (highest) thermocouple in each bin and the first thermocouple in the next bin for the reason that such last thermocouple may very well be in the air and thus subject to wide variations in ambient temperatures while others below are in the grain and insulated somewhat thereby. Since room temperature will usually be near seventy-five degrees F., a reading at about the center of the temperature scale on the instrument, less change will thus be required in the instrument reading from one bin to the next. The switch 68 may be connected by duplex conductors 189—190 to a thermocouple 191 in the instrument room to place this thermocouple in the input to the instrument for this purpose. Or the instrument itself may contain provision for reading at midscale as the switch 68 is closed if so desired.

As thus far described the system is operated throughout by alternating current. In some instances a source of such current may not be readily available aloft in the elevator, near the bins, and in such cases the circuit of Fig. 8 may be employed to at least equal advantage. In this system the stepping switches 22–25 and other components in the master control unit are again operated by alternating current but direct current (actually rectified alternating current) is used aloft for the slave bin and thermocouple selector switches. This combined alternating-direct current system also has the advantage that less current is required for driving the slave selector switches aloft and it is possible to place the rectifier in the master unit, totally eliminating the need for transformers in the section boxes.

Figure 8:
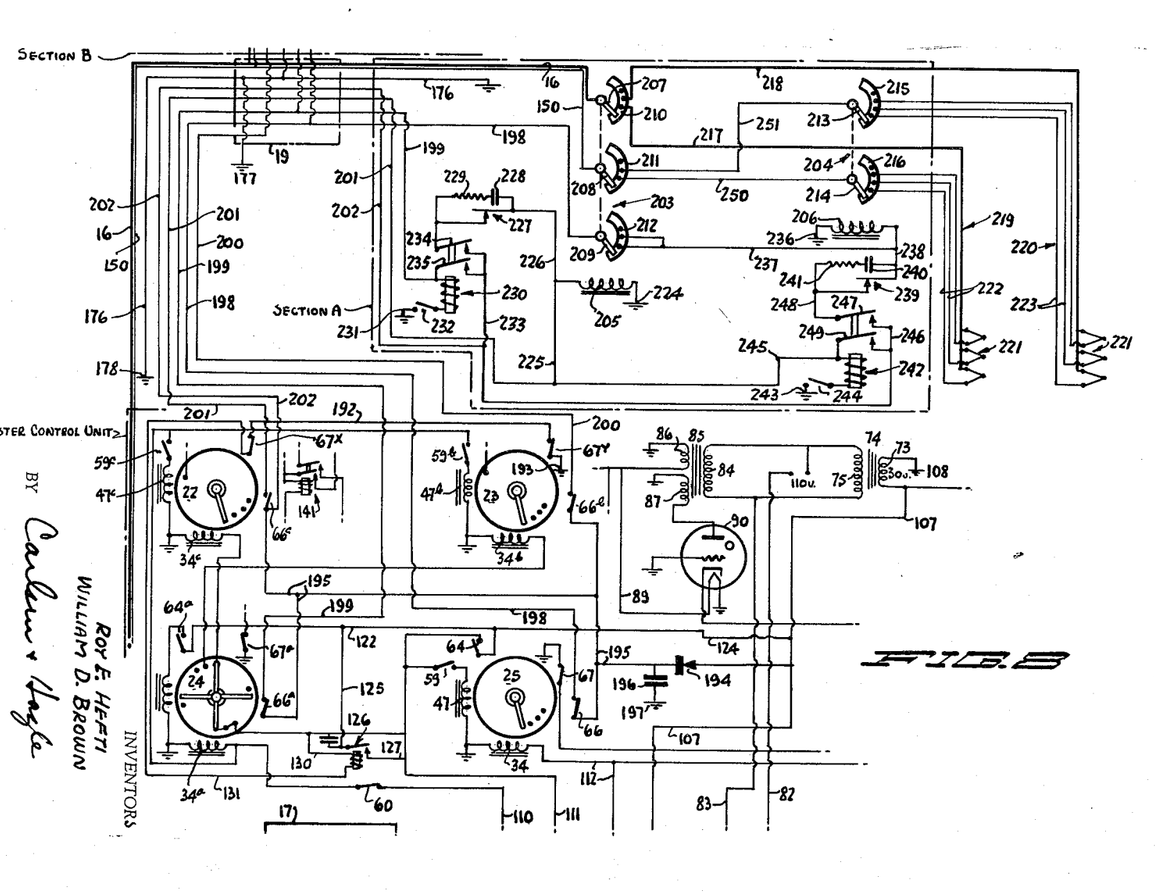
Fig. 8 is a schematic similar to Fig. 1 but showing a combination alternating-direct current system, some parts of the circuit of Fig. 1 which are identical being omitted for clarity.

In Fig. 8 such parts of the alternating current operating master control unit of Fig. 1 are repeated as necessary for an understanding of the invention but the timer and master switch assemblies are omitted, as is some of the interconnecting wiring.

First to be described will be the minor variations in the master unit and it will be noted that microswitches 67x and 67y have been added to the bin selector stepping switches 22 and 23 respectively, these being normally closed switches which open each full step up or forward of the stepping switches. The conductor 131 leading to interlock relay 126 now is connected to one terminal of switch 67x and the other terminal thereof is connected through a conductor 192 to one terminal of switch 67y while the remaining terminal of the latter is grounded at 193. The switches 67x and 67y are thus in series and these switches correspond functionally to the series connected switches 67e and 67f of Fig. 1 to insure that regardless of how short the impulse sent to the set solenoids 34b and 34c the stepping switches 22—23 must move a full step up or forward. Note that as the circuit is completed to either of the set solenoids of the switches 22—23 through the section switch 24 the relay circuit is closed and its lock down, sending energy from conductor 125 and the relay contacts to appropriate set solenoids until either of the microswitches 67x or 67y (it matters not which) is opened on completion of a full step operation of the corresponding stepping switch 22 or 23.

In addition a rectifier 194 is connected to conductor 107 leading to the ungrounded terminal of the secondary winding 73 of transformer 74 and the rectified alternating current output of the rectifier is connected by branching conductors denoted collectively at 195 to one terminal of each of the microswitches 66, 66a, 66b and 66c on the stepping switches 22-25. A filter condenser 196 is connected between the rectifier output side and ground 197 for smoothing purposes and hereafter this rectified alternating current will be referred to for convenience as direct current.

The remaining terminals of the microswitches 66, 66a, 66b and 66c are connected to conductors 198, 199, 200 and 201 respectively, in addition to which another conductor 202 extends from the branching conductor 195 (here shown as connected at switch 66c), all of these conductors 198–202 leading along with the duplex copper-Constantan to and through the junction box 19.

In the section A box the direct current actuated components are located and will now be described, it being, of course, understood that similar components and circuits will be found in the other section boxes. Instead of the stepping switches 20—21 operated by alternating current as in Fig. 1, commercially available direct current actuated stepping switches are employed, there being a bin selector switch designated generally at 203 and thermocouple selector switch designated generally at 204. These switches 203—204 have the desirable stepping characteristic, moving their contact arms one step forward, from one contact to the next, each time their solenoids 205—206 are energized but they reset or home by moving forwardly through their full cycles, rather than by reversing as the case in the alternating current switches previously described. Also the switches are made up with a series of banks of electrically separate contact arms all on a common shaft for simultaneous operation, and corresponding banks of separate rows of contacts, which contact arms and contacts function as the actual switches, operating in sequence and in timed relation to each other.

In the present instance and for example stepping switch 203 has three ganged contact arms 207, 208 and 209 operating over three series of contacts 210, 211 and 212, and constituting a separate bin selector switch, while switch 204 has two ganged contact arms 213, 214 and two separate series of contacts 215, 216 each constituting a separate thermocouple selector switch. The duplex entering section A has the Constantan 16 connected to switch arm 207 of the bin selector switch 203 to break the Constantan, and a copper 150 connected to switch arm 208 while the conductor 198 leading to microswitch 66 in the master unit is connected to the remaining arm 209 of the switch 203. Separate conductors 217 and 218 of Constantan lead from the contacts 210 of the bin selector switch 203 to separate cables 219 and 220 each here shown as having only three thermocouples designated collectively 221. The copper conductors 222 of cable 219 lead to the contacts 216 of thermocouple selector switch 204 while the copper conductors 223 of cable 220 lead to the contacts 215.

One terminal of the solenoid 205 for the bin selector switch 203 is grounded at 224 while the other is connected by a conductor 225 to the conductor 201 leading to the microswitch 66c at the stepping switch 22 and is also connected by a conductor 226 to one terminal of an interrupter (spring) switch 227 across which switch are connected a capacitor 228 and resistor 229 in series to reduce arcing at the contacts. A bin selector switch homing relay 230 is provided and the coil thereof has one terminal connected to ground 231 through a switch 232 operated by the bin selector switch 203 and which switch 232 is open only at the zero or normal position of switch 203. The other terminal of the relay coil is connected to the conductor 199 leading from the microswitch 66a at the stepping switch 24 in the master control unit. The relay 230 operates a double-pole single-throw relay switch having fixed contacts which are tied together and connected by a conductor 233 to the conductor 202 which is connected to the direct current source in the master control unit. The relay switch is normally open and its upper moving pole 234 is connected to the interrupter switch 227 while its lower moving pole 235 is connected to the aforesaid conductor 199.

Similarly the actuating solenoid 206 for the thermocouple selector switch 204 has one terminal grounded at 236 while its other terminal is connected by a conductor 237 to the first two contacts 212 of the bin selector switch 203. This ungrounded terminal of solenoid 206 is also connected by conductor 238 to one terminal of an interrupter switch 239 across which switch are connected a capacitor 240 and resistor 241 to reduce arcing at the switch contacts. A second homing relay 242 is provided and one terminal of the coil thereof is connected to ground 243 through a switch 244 operated by the bin selector switch 204 and open only at the zero thermocouple or normal position of that switch. The other terminal of the relay coil is connected by a conductor 245 to the conductor 201 leading to microswitch 66c in the master control unit. Here again this relay 242 operates a normally open, double-pole single-throw relay switch, the fixed contacts of which are tied together and connected by a conductor 246 to the conductor 202 aforesaid. The upper moving pole 247 of the relay switch 242 is connected by a conductor 248 to the interrupter switch 239, while the lower moving pole 249 of the switch is connected to the aforesaid conductor 245.

In the operation of this combination alternating current and direct current system there is no change in the sequence of operations in the master control unit except for the interlocking circuit previously described and sections, bins and thermocouples are selected in exactly the same manner heretofore set forth in detail. When the bin is selected at the master control unit, however, and assuming of course that it is bins in section A which are being selected, then the microswitch 66c will be closed on each step up or forward of the master bin selector stepping switch 22. At this switch closes direct current will be sent up through the conductor 201 and through conductor 225 to the solenoid 205 causing the direct current bin selector switch 203 to move up one step for each such operation. As the contact arm 207 of this switch 203 moves up to its first contact a circuit will be completed from the Constantan 16 of the duplex to the Constantan lead 217 for cable 219, thus connecting this first cable in circuit. At the same time the switch arm 208 of stepping switch 203, as it reaches its first off-normal contact, will close a circuit through a copper conductor 250 to the switch arm 214 of thermocouple selector switch 204 for sequentially completing circuits to the copper conductors 222 of cable 219. Also at the same time the switch arm 209 of stepping switch 203, as it reaches its first off-normal contact, will close a circuit through conductor 237 to the ungrounded terminal of the solenoid 206 operating the thermocouple switch 204. Thus the system is conditioned for the selection of thermocouples in the first cable 219 and a subsequent operation of the master thermocouple selector switch 25 and successive closing actions of the microswitch 66 will send up direct current to the conductor 198, the switch arm 209 and conductor 237 to successively energize the solenoid 206 and cause the slave thermocouple selector switch 204 to be stepped up progressively. It will be observed that when thermocouples in the second cables 220 are to be read, then the solenoid 205 will be energized a second time in the same manner just described, causing the bin selector switch 203 to move up to the second off-normal position. As this is done the arm 207 of switch 203 will clear the Constantan conductor 217 but will connect the Constantan 16 of the duplex to the second Constantan lead 218 while at the same time the arm 208 will complete a circuit from the copper conductor 150 of the duplex through a copper conductor 251 to the arm 213 of the thermocouple selector switch 204, readying the system for connection in succession to the thermocouples of the second cable 220. It will be noted that the first two off-normal contacts of the contacts 212 of switch 203 are both tied to the conductor 237 so that the thermocouple selector switch 204 may again be moved up by actuating its solenoid 206 as just described. Since the arms 213—214 of the thermocouple selector switch 204 are ganged it will be readily appreciated that a considerable number may be arranged for operation by the same shaft and by suitably wiring the bin selector switch 203 connection may be made to the various cables in any desired sequence, adding much to the flexibility and versatility of the system as a whole.

When all of the thermocouples in a particular cable or any desired number thereof have been read the bin switch in the master control unit is closed and the bin selector switch will move up to the next position. At the same time the microswitch 66c will be closed sending direct current up through the conductor 201 and through conductor 245 to the coil of the homing relay 242 for the thermocouple selector switch 204. Unless this switch 204 is at its normal or zero thermocouple position, which of course it will not be if thermocouples have just been selected and read, then the switch 244 will be closed and a direct current circuit will be completed through the coil of the homing relay, traced, of course, from the conductor 195 through conductor 201 and conductor 245 and through the coil to ground 243. Thus the relay 242 will be closed and the lower contact 245 of the relay switch will hold the homing circuit closed through the coil of the relay from the conductor 245 to the conductor 246, which leads to the conductor 202 sending direct current up from the master control unit. At the same time the upper pole 247 of the relay switch will close a circuit through the conductor 248 and the interrupter switch 239 and conductor 238 to the solenoid 206 moving the thermocouple selector switch 204 up one step. However, each time the thermocouple selector switch moves up a step the interrupter switch 239 will be opened, thereby momentarily interrupting this circuit but immediately reclosing it so that the thermocouple switch 204 will be homed in a forward direction until it reaches its normal position at which point switch 244 will be opened to open the homing circuit to the stepping switch. This action and arrangement of the interrupter switch 239 is entirely conventional insofar as its effect upon the selector switch 204 and is commonly referred to as a "doorbell" action switch.

After readings have been taken from all or any desired number of bins in any particular section on which this operation is being performed, the section selector switch in the master control unit is closed and each time the stepping switch 24 moves forward a step in microswitch 66a is momentarily closed. This sends direct current from conductor 195 through microswitch 66a to conductor 199 and through the coil of the homing relay 230, it being here also understood that the switch 232 will be closed at this time and the circuit will be completed to ground 231. With the relay thus energized the two moving poles 234—235 will be locked down and a circuit will be completed from conductor 199 through pole 235 to the relay coil to hold the relay in its locked down condition. At the same time a circuit will be completed from the conductor 202 supplying direct current and through conductor 233 and upper moving pole 234 to the interrupter switch 227 and through the conductor 226 to the solenoid 205 to move the bin selector switch up a step. Each time this bin selector moves forward a step the interrupter switch 227 is opened and then reclosed so that the switch 203 is homed by the same "doorbell" action previously described, until the switch reaches its normal position at which point the switch 232 will be opened and the homing circuit to the switch 203 opened. It is believed that the operation of this direct current version of the system will be fully understandable to those skilled in the art without further description to this point.

It is also believed that the overall flexibility and versatility of the system will be readily appreciated from the foregoing detailed description and it is found in actual practice and through extensive use that the system meets all of the problems of reading temperatures at remote points with a minimum of interconnecting wiring while permitting complete flexibility as to the points to be checked at any given time. It will also be understood that in both the alternating current and the combined alternating current and direct current versions the system operates with no current flowing in the interconnecting wiring whatever when readings are being taken at the various thermocouples. Immediately as a thermocouple has been selected for reading all circuits except those through the duplex are open and thus there are no currents flowing which might in any way interfere with the proper reading of temperatures.

Hereinbefore we have used the common designations of sections and bins as a convenience in describing our invention, these being the designations prevalent in elevators to denote the various areas of the overall establishment. To facilitate properly claiming our invention hereinafter, and with particular regard to its uses in other industries we will in some instances use the broader designations "area" and "areas" to denote the places wherein the groups of thermocouples are located. For example in a large greenhouse the thermocouples might well be located in separate building units or separate areas of one or more of such units and the area designation is thus believed to be more comprehensive.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A thermoelectric temperature measuring system for indicating at a remote master unit the temperature in bins of stored materials and which bins are arranged in sections, comprising in combination, a series of thermocouples in each of said bins and each series having a constantan and a series of copper conductors, a temperature indicating instrument at said master unit and having input terminals one of which is connected to the constantan conductors of said thermocouple series, a series of electromagnetically actuated stepping switches including a master thermocouple selector switch, a section selector switch and a bin selector switch for each section, all located at the master unit, electromagnetically operated stepping switches at the sections and there being slave thermocouple selector switches connected to the copper conductors of the thermocouples and a bin selector switch controlling said slave switches, and electrical circuits controlling the slave switches through the bin switches in the sections and through the switches in the master unit for selectively connecting the instrument to the copper conductors of the individual thermocouples, said electrical circuits including at the master unit manually operative switches for selecting the thermocouples, bins and sections where temperature indications are to be taken, and an automatic electronic timing circuit connected to said master selector switch for sequentially selecting thermocouples at predetermined time intervals.

2. A thermoelectric temperature measuring system for indicating at a remote master unit the temperature in bins of stored materials and which bins are arranged in sections, comprising in combination, a series of thermocouples in each of said bins and each series having a constantan and a series of copper conductors, a temperature indicating instrument at said master unit and having input terminals one of which is connected to the constantan conductors of said thermocouple series, a series of electromagnetically actuated stepping switches including a master thermocouple selector switch, a section selector switch and a bin selector switch for each section, all located at the master unit, electromagnetically operated stepping switches at the sections and there being slave thermocouple selector switches connected to the copper conductors of the thermocouples and a bin selector switch controlling said slave switches, electrical circuits controlling the slave switches through the bin switches in the sections and through the switches in the master unit for selectively connecting the instrument to the copper conductors of the individual thermocouples, said electrical circuits including at the master unit manually operative switches for selecting the thermocouples, bins and sections where temperature indications are to be taken and also including interlock control circuits operative to insure the completion of each operation of selecting a thermocouple once such operation has been initiated.

3. Temperature indicating means for indicating from a remote control unit the temperature of grain stored in the bins of a grain elevator and in which elevator the bins are arranged in sections and thermocouple cables having constantan wires and separate copper conductors are suspended in the bins, comprising in combination, a temperature indicating instrument at said remote control unit connected to the constantan wires of the cables, a copper conductor leading from the instrument to said sections, electromagnetically operated stepping switches at the bins for making connections to the copper conductors of the cables in said bins, a similar stepping switch at each section for making selective connections to the switches connected to the cables, electrical circuit means in the master unit for sending energy to the said stepping switches and selecting the copper conductors of the cables to be connected to the copper conductor leading from the instrument, the said electrical circuit means including at the master control unit a master thermocouple selector switch, a section selector switch and a master bin selector switch for each section all of which are of the electromagnetically operative stepping variety having a series of contacts and moving wiper arms, a series of switches operative in relation to movement of said wiper arms and having circuits to control the first mentioned stepping switches, and pilot light circuits completed through the said contacts and wiper arms for indicating the thermocouples, bins and sections at which temperature indications are being taken at any given time.

4. Temperature indicating means for indicating from a remote control unit the temperature of grain stored in the bins of a grain elevator and in which elevator the bins are arranged in sections and thermocouple cables having common constantan wires and separate copper conductors are suspended in the bins, comprising in combination, a temperature indicating instrument at said remote control unit connected to the constantan wires of the cables, a copper conductor leading from the instrument to said sections, electromagnetically operated stepping switches at the bins and circuits for making connections to the copper conductors of the cables in said bins, a similar stepping switch at each section and circuits for making selective connections to the switches connected to the cables, circuits in the master unit for sending energy to the said stepping switches and selecting the copper conductors of the cables to be connected to the copper conductor leading from the instrument, the said last mentioned circuits including at the master control unit a master thermocouple selector switch and a section selector switch and a master bin selector switch for each section all of which are of the electromagnetically operative stepping variety having a series of contacts and moving wiper arms, a series of switches mechanically operated on movement of said wiper arms and having circuits to control the first mentioned stepping switches, pilot light circuits completed through the said contacts and wiper arms for indicating the thermocouples, bins and sections at which temperature indications are being taken at any given time, manually operative control switches at the master control unit and circuits controlled thereby for operating the stepping switches at said unit, a timing circuit operative to cyclically and automatically select thermocouples in the cables for connection to the instrument, and an overriding circuit for overriding the timing circuit and interrupting the cyclical operation of the system.

5. A thermoelectric measuring system of the character described comprising in combination, a plurality of series of thermocouples and each series having a constantan and a series of copper conductors, an electromagnetically operated stepping slave switch for each series of thermocouples and each switch having a wiper and a series of contacts and the latter being connected to the copper conductors of the thermocouples, an electromagnetically operated selector stepping switch having a wiper and a series of contacts and circuits connecting the latter to select the slave switches as the selector stepping switch is stepped forward, a remote master station having a temperature reading instrument connected to the constantan of all the series of thermocouples, a copper conductor connecting the wiper of the slave switches to the instrument, a selector circuit operative from the master station to step the selector switch forward and thereby select the slave switches, a stepping circuit means operative from the master station through the selector switch to step the slave switches forward and connect the thermocouples in succession to the instrument, resetting circuits for returning the slave and selector switches to starting positions, and an electronic timing circuit operative with said stepping circuit to automatically step the slave switches forward at preselected time intervals.

6. A thermoelectric measuring system of the character described comprising a combination, a plurality of series of thermocouples and each series having a constantan and a series of copper conductors, an electromagentically operated stepping slave switch for each series of thermocouples and each switch having a wiper and a series of contacts and the latter being connected to the copper conductors of the thermocouples, an electromagnetically operated selector stepping switch having a wiper and a series of contacts and circuits connecting the latter to break the constantan to the series of thermocouples and to select the slave switches as the selector stepping switch is stepped forward, a remote master station having a temperature indicating device having a constantan conductor connectible through said selector switch to the constantans of the series of thermocouples, a copper conductor connecting the wiper of the slave switches to the temperature indicating device, a selector circuit operative from the master station to step the selector switch forward and thereby select the sleve switches, a stepping circuit means operative from the master station through the selector switch to step the slave switches forward and connect the thermocouples in succession to the temperature indicating device, and a timing device connected to said master selector switch for automatically operating the system and connecting the temperaure indicating device to the thermocouples one after another.

References Cited in the file of this patent

UNITED STATES PATENTS

| 1,277,464 | Norwood et al. | Sept. 3, 1918 |
| 1,496,101 | Schmitt | June 3, 1924 |
| 2,549,401 | Stein et al. | Apr. 17, 1951 |
| 2,606,808 | Brown | Aug. 12, 1952 |
| 2,753,713 | Mabey | July 10, 1956 |